United States Patent
Bahr et al.

[15] 3,670,774
[45] June 20, 1972

[54] CONTROLLED LEAKAGE CONDUIT FOR DELIVERING A FLUID TO A HEAT SOURCE

[72] Inventors: William T. Bahr, Wallingford; Robert V. Lewis, Woodbury, both of Conn.

[73] Assignee: Anaconda American Brass Company, Waterbury, Conn.

[22] Filed: Feb. 11, 1971

[21] Appl. No.: 114,616

[52] U.S. Cl.................................138/178, 138/32
[51] Int. Cl..............................................F16l 11/12
[58] Field of Search..........................138/178, 130, 32

[56] References Cited

UNITED STATES PATENTS

| | | | |
|---|---|---|---|
| 1,386,791 | 8/1921 | Murdock | 138/178 |
| 2,247,416 | 7/1941 | Sands | 138/130 |
| 2,278,294 | 3/1942 | Wiggins | 138/32 |

Primary Examiner—Robert G. Nilson
Assistant Examiner—William H. Wright
Attorney—Pennie, Edmonds, Morton, Taylor and Adams

[57] ABSTRACT

A fluid conduit adapted to form ruptured orifices in areas along its length when the areas or portions are subjected to selected temperatures resulting from the proximity of a high temperature heat source, the orifices thereby selectively delivering the fluid to reduce such temperature of the heat source. The conduit includes a pressure-rupturable body and reenforcing elements for reenforcing portions of the body to withstand high temperatures and to assure that the conduit continues to transmit fluid past ruptured conduit areas. The body is adapted to rupture in portions not supported at high temperatures by the reenforcing elements where combined internal pressure and the reduced strength at high temperatures results in failure of these portions of the body. The portions of the body which do not rupture continue to function as a conduit leading fluid to other areas along the conduit.

6 Claims, 4 Drawing Figures 3,670,774

INVENTORS
WILLIAM T. BAHR
ROBERT V. LEWIS

BY Pennie, Edmonds,
Morton, Taylor & Adams
ATTORNEYS

CONTROLLED LEAKAGE CONDUIT FOR DELIVERING A FLUID TO A HEAT SOURCE

BACKGROUND OF THE INVENTION

Conduits comprising a plastic liner which is reinforced with metal strips spirally wound around the liner have been known for many years for handling corrosive liquids, such as beverages. The reinforcing strips function to increase the pressure carrying capability of conduit. Such conduits have been designed and applied to industrial use in such a manner that failure or rupture of the conduit was intentionally avoided.

In the field of installed fire extinguishing systems, valves have been located at selectively-spaced positions in conduits which valves have been adapted to open by the melting of materials in the valve or by remote controlled means for operating the valves in response to a signal that a fire has started. These systems lack the ability to discharge the fire extinguishing fluid at points between the valve locations when the development of a fire or other heat source is located such that the high temperature is first reached at a point between valves. Valves are usually spaced many feet apart thus leaving little or no heat sensitivity between the valves. Until a fire breaks out in close proximity operation of such valves is delayed. When the valve is finally operated, it is often not properly positioned for most effective heat reduction since it is not located adjacent to the areas of higher temperatures.

The present invention provides a more versatile arrangement by using a specially adapted conduit including a plastic liner all portions of which are integral with each other, which develops discharge orifices by rupturing of such liner in one or more or more areas along its length in response to selected high temperatures thus forming orifices adjacent to the areas of higher temperature and thereafter developing increasing numbers of orifices in the area if the source of high temperature increases in size.

The present invention is particularly advantageous in fighting small incipient fires or in cooling other heat sources which may start and develop at a variety of locations in a room, compartment, passageway or other area. The conduit immediately responds to selected high temperatures at any point along its length to commence discharge of sufficient cooling fluid.

SUMMARY OF THE INVENTION

Broadly, the present invention is a conduit comprising a rupturable body adapted to rupture in a plurality of unsupported portions under conditions of selected internal pressure and externally applied heat of sufficient intensity. The body is reenforced by high temperature resistant elements surrounding or imbedded in it to support the body in the portions adjacent the portions that will rupture. The conduit thus includes a first plurality of portions supported so that they are able to withstand certain pressures and temperatures and a second plurality of portions adapted to rupture under these pressures and temperatures to discharge a fire extinguishing or cooling fluid. The second plurality of body portions may be supported by other elements which, at lower temperatures, remain effective as supports but which at high temperatures weaken to permit the body to rupture in these portions to form the fluid discharge orifices.

It is a feature of the invention that ruptured orifices will form in the conduit at the areas of higher temperature and thereby direct the fluid selectively at the heat source.

It is also a feature that an increase in the size of the heat source will cause additional outlets to form in the portions of the conduit adjacent the areas of increasing temperature as the source expands.

The conduit of the present invention may be used in a system in which the fluid is present in the conduit during normal non-fire or over-temperature conditions or may be used in systems where a temperature or smoke detector operates a valve to allow the fluid to flow into the conduit system. Since no area of the conduit will rupture until that area is heated to the selected temperature, there is no undesired discharge when pressure is applied either at the time of installation and initial pressurizing of a system or when a normally empty or low pressure system is pressurized with the fire fighting fluid after detection of the fire.

The conduit of this invention may, of course, be used to cool or reduce heating in areas prior to the development of any combustion in those areas as well as reducing the temperature of materials in the process of combustion, for example, overheating insulation in an electric motor may be cooled using the present invention.

PREFERRED EMBODIMENT OF THE INVENTION

Figure 1:
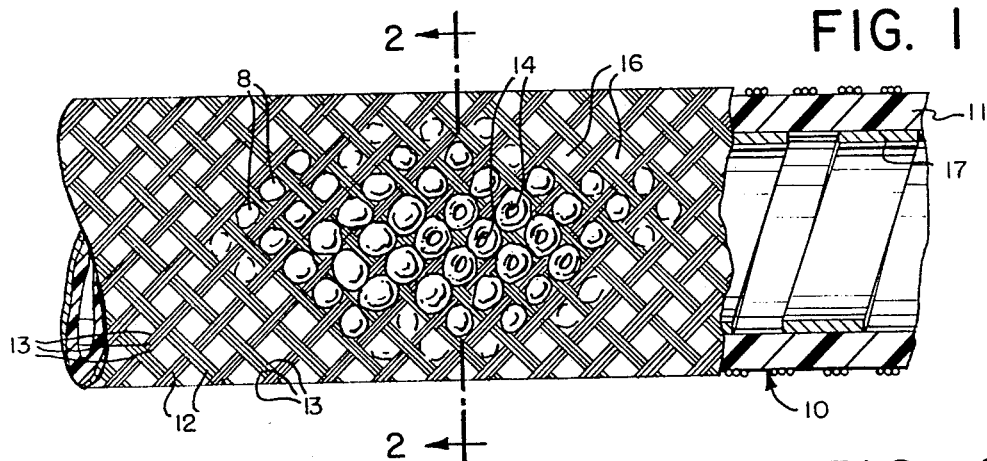
FIG. 1 is an elevational view of a length of the conduit.
Figure 2:
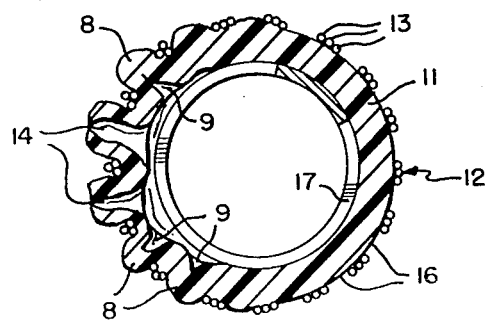
FIG. 2 is a sectional view taken along line 2—2 of FIG. 1.

Referring to FIGS. 1 and 2, flexible conduit 10 includes tubular body 11 all portions of which are integral with each other which is preferably made of a thermoplastic material such as polyvinyl chloride but may be made of any material which will rupture when subjected to a predetermined pressure and temperature. The conduit 10 may be tubular, as shown, or may have any other desired cross-sectional configuration. The integral relationship between portions of the body which rupture and portions which do not rupture may, for example, be accomplished by using an extrusion process to form the body.

Wound around body 11 in a criss-cross or braided manner are spaced-apart strands 12 each comprised of three wires 13. Any suitable number of wires 13 may be used to form strand 12 or the strand may be made of strip material. Strands 12 are capable of withstanding high temperatures, such as those experienced in fires, without melting or weakening to the degree that normal internal pressure in the body would cause the strands to break. Strands 12 provide a border support to facilitate the development of ruptures 14 in body 11 when pressure is applied to portions 16 which are not reenforced by strands 12. Strands 12 may be made of stainless steel or other high melting point material and, if desired, may be imbedded in the body or formed as part of the body.

An internal coil spring 17 is inside body 11 to provide internal support which prevents collapsing of the tubular body when it is not pressurized and is subjected to bending and other loading. Spring 17 may be partially or fully imbedded in the wall of body 11 to lessen or avoid resistance to flow within the body. In many applications, the internal support spring may not be required.

In FIG. 2, the portions of body 11 are shown being extruded through the orifice openings between the strands with orifices 14 being fully developed to discharge fluid while other extruded portions of body 11 had started to develop forming bulges 8 and cavities 9 but had not ruptured.

Figure 3:
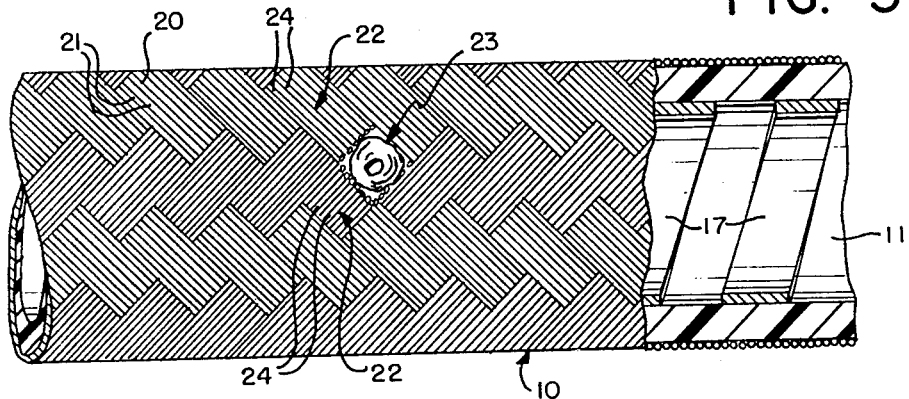

Referring now to FIG. 3, another embodiment of the invention is shown having a different strand reenforcing arrangement. Strands 20 are comprised of wires 21 which are resistant to high temperature. Two strands 22, which cross one another at area 23, comprise wires 24 made of a material which melts or weakens at lower temperatures. When strands 22 weaken due to heat in overlapping area 23, the portion of the body 11 under area 23 is left unsupported and a rupture forms at this point when internal pressure is applied. Similar areas 23 will appear at intervals along the conduit since the oppposingly spiralled strands 22 overlap once in each 180° turn around the body.

Body 11 may be made of any suitable material, including a thermoplastic or thermosetting material. The wall thickness of the body should be such that the internal pressure will cause a rupture when the strands 22 lose their strength at selected high temperatures. All materials suitable for use in forming the body weaken at increased temperature which weakening contributes to the rupture of the body.

This second embodiment provides an arrangement in which selection and use of strands or portions of strands having known melting or softening temperature can be used to provide the size and number of orifices which will rupture at selected temperatures. Rigid tubular reenforcing elements comprising portions made of materials of differing melting points may also be used to accomplish reduction or termination of support of selected portions and areas of the body at selected temperatures. For example, these different materials may be used to provide termination of support at one temperature in certain portions, at another temperature in other portions while continuing to provide support in a third portion at these temperatures.

Figure 4:
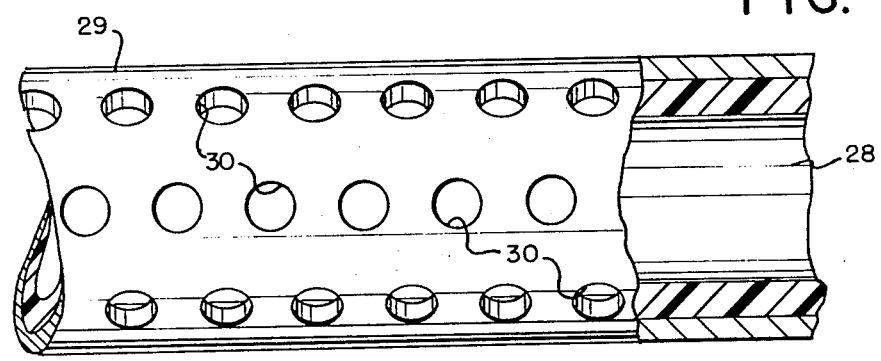
FIG. 3 is an elevational view of a length of a conduit illustrating another embodiment of the invention and
FIG. 4 is a partially cut-away view of a further embodiment of the invention.

Turning to FIG. 4, a further embodiment is shown in which the plastic body 28, all portions of which are integral with each other, is surrounded by a rigid metal tube or jacket 29. Tube 29 has numerous closely-spaced holes or perforations 30 in it to permit the body 28 to rupture and extend through these holes to discharge the fire fighting or cooling fluid. The material, diameter and thickness of body 28 are selected to cause failure at a selected temperature and selected pressure. For example, a body 28 made of polyvinyl chloride, having a diameter of three-eighths inch I.D. and a wall thickness of 0.060 inches, will rupture at a temperature of approximately 180° F. when the internal pressure is 300 psi and when the unsupported area equals at least 0.004 square inches.

EXAMPLE I

A flexible tubular plastic hose having a three-eighths inch inside diameter and a wall thickness one-sixteenths of an inch was helically wrapped with a group of stainless steel alloy strands having widths of one thirty-seconds inches. A second group of strands was woven with the first group in the opposite direction to form a braid arrangement in which the strands were spaced about one-sixteenths of an inch apart, leaving unsupported areas of the plastic tube each having approximately a 0.004 square inch area. The flexible conduit so formed had approximately 33 percent of outer body left unsupported by the reenforcing braid thus providing a substantial number of areas capable of rupture and fluid discharge. The conduit was supported in a generally horizontal position using hangers at two foot intervals and the conduit was pressurized with $CO_2$ to about 800 psi.

A hot air heat source which discharged 200° F. air at a rate of about 100 cubic feet a minute was placed about one foot from and directed at the surface of the conduit. In a few minutes, the conduit began rupturing and $CO_2$ was discharged. A total of 23 areas were ruptured during the test run which ruptures were located in about a 2 inch length of the conduit. It was observed during the test that the $CO_2$ discharge was directed at the hot air heat source further showing the fire fighting fluid is discharged in the areas where the temperature indicates the fire is located.

EXAMPLE II

The tubular plastic hose of Example I was placed in an electric cable tray and the electrical cable was electrically overloaded to create high temperature in the tray. The hose developed ruptures in five locations along the tube. The hose continued to function as a fluid conduit throughout its length during the test since evidence of substantial discharge of $CO_2$ was observed at each of the five locations.

It has been found that using conduit bodies and reenforcing elements having differing surface characteristics, including color and texture, varies the rate at which they are heated by the heat source and, in particular, it has been found to be advantageous to use conduit bodies and reenforcing elements having surface characteristics which heat rapidly to accelerate rupture. For example, black conduits reflect less radiant energy and heat more rapidly than light colored conduits. All or part of the conduit may include rapidly heatable surfaces. Rupture of the body as soon after development of the heat source is desirable and it is preferable to accomplish this by selection of the surface characteristic rather than reducing the pressure-carrying capacity of conduit since failure of conduit when the conduit is accidentally pressurized is to be avoided.

We claim:

1. An elongated conduit adapted to discharge a fluid from an area of the conduit to reduce the temperature of a heat source when said area is subjected to a selected temperature by the heat source and subjected to a selected pressure comprising a body and reenforcing elements for reenforcing the body at high temperatures, said reenforcing elements capable of withstanding selected high temperatures extending around the body to provide reenforcing of a plurality of first portions of the body while leaving a plurality of second portions of the body unreenforced at selected high temperatures, said second portions of the body adapted to rupture at selected fluid pressures and such selected high temperatures to provide a plurality of ruptured orifices for discharge of the fluid from said area, all portions, including said first and second portions, of said body being integral with each other.

2. The conduit of claim 1 in which the body is sufficiently flexible to be collapsible and having support means to support the body against collapsing.

3. The conduit of claim 1 in which certain second portions of the body are supported by a second group of reenforcing elements which weaken at selected high temperatures substantially reducing their support of such certain second portions resulting in rupture of those portions at said selected fluid pressures and selected high temperatures.

4. The conduit of claim 1 in which the body is a flexible plastic tube and in which the reenforcing elements are braided strands of high temperature resistance metal.

5. The conduit of claim 1 in which said reenforcing elements comprise a perforated metal jacket surrounding the body.

6. The conduit of claim 1 in which at least a portion of the surface is rapidly heatable.

* * * * *